US009537516B1

(12) United States Patent
Ryu

(10) Patent No.: US 9,537,516 B1
(45) Date of Patent: Jan. 3, 2017

(54) EDGE COMBINING TRANSMITTER

(71) Applicant: Albert B Ryu, San Diego, CA (US)

(72) Inventor: Albert B Ryu, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 227 days.

(21) Appl. No.: 14/038,028

(22) Filed: Sep. 26, 2013

(51) Int. Cl.
    *H04B 1/04* (2006.01)
    *H03D 7/00* (2006.01)

(52) U.S. Cl.
    CPC . *H04B 1/04* (2013.01); *H03D 7/00* (2013.01)

(58) Field of Classification Search
    CPC combination set(s) only.
    See application file for complete search history.

(56) References Cited

U.S. PATENT DOCUMENTS

| 8,385,456 | B2 | 2/2013 | Lee et al. | |
|---|---|---|---|---|
| 2002/0113660 | A1* | 8/2002 | Dally | H03K 3/0315 331/135 |
| 2009/0091362 | A1* | 4/2009 | Pellerano | H03L 7/0812 327/158 |
| 2013/0058384 | A1* | 3/2013 | Otis | G06F 7/68 375/219 |
| 2014/0362952 | A1* | 12/2014 | Cheng | H04L 27/12 375/303 |
| 2015/0035378 | A1* | 2/2015 | Calhoun | A61B 5/04004 307/104 |

FOREIGN PATENT DOCUMENTS

WO  WO2012/173573  * 12/2012 ............ H04L 27/12

OTHER PUBLICATIONS

Choi, Dec. 2010, "Fully-Integrated DLL/PLL-Based CMOS Frequency Synthesizers for Wireless Systems", https://smartech.gatech.edu/bitstream/handle/1853/42698/choi_jaehyouk_201012_phd.pdf.*
Pandey, Jagdish, and Brian P. Otis, "A Sub-100 uW MICS/ISM Band Transmitter Based on Injection-Locking and Frequency Multiplication," IEEE JSSC, May 2011 p. 1049. vol. 46-5.

* cited by examiner

*Primary Examiner* — Junpeng Chen
(74) *Attorney, Agent, or Firm* — SPAWAR Systems Center Pacific; Kyle Eppele; Susanna J. Torke

(57) ABSTRACT

The present invention is directed to a transmitter system. The system is made up of a reference clock, a differential oscillator and an edge combining power amplifier (ECPA). The clock feeds a low frequency reference signal into the differential oscillator to produce at least two low frequency outputs with opposite phases. Each low frequency output is made up of a number of low frequency subsignals equal to the number of oscillator stages. Each low frequency output is fed into a branch in the ECPA having a number of sub-branches equal to the number of oscillator stages. A processor uses an edge combining algorithm to combine these subsignals into a high frequency signal.

19 Claims, 3 Drawing Sheets

EDGE COMBINING TRANSMITTER

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 101972.

BACKGROUND

1. Field

This invention relates to the field of transmitting systems, and more specifically, to an injection-locked differential oscillator transmission system.

2. Background

Power conservation is a critical concern for many transmitting systems known in the art. Power creates electromagnetic signals for transmission and is used by processors which receive the signals. Higher frequency signals require increased component power consumption. A signal created by a transmitter generally travels a path between the device that generates the signal and an antenna. While the signal does not need a high frequency along this path, most antennas which receive a communications signal for transmission to a receiving device only have the capability to transfer signals at a high frequency. Therefore the signal must be upconverted at some time prior to transmission.

An article published by the IEEE Journal of Solid-State Circuits in 2011, entitled "A Sub-100 µW MICS/ISM Band Transmitter Based on Injection-Locking and Frequency Multiplication", authored by J. Pandey et al., is hereby incorporated by reference in its entirety for its teachings on the use of injection-locked frequency multiplication (ILFM) systems. An ILFM system uses a circuit assembly to delay conversion from low to high frequency for as long as possible in order to conserve power. In an ILFM system, a low frequency clock creates a "steady" signal with a constant amplitude. The clock is coupled to a frequency oscillator with multiple phase outputs. All of these outputs feed into a component called an edge combining power amplifier (ECPA). The ECPA uses digital logic to combine the waveform signals into a single high frequency signal. The output logic is based on the following expression:

Output=$AB+BC+CA$, where $A$, $B$ and $C$ are outputs from the oscillator.

In an ILFM system, only the ECPA operates in high frequency. This reduces overall power consumption to about 90 µW.

A problem known in the art with the ILFM system is that it is limited to Frequency-Shift Keying (FSK) modulation and cannot perform On-Off Keying (OOK) modulation, Binary Phase-Shift Keying (BPSK) modulation or Quadrature Phase Shift Keying (QPSK) modulation. An FSK modulation requires a higher signal-to-noise ratio than OOK, BPSK, or QPSK modulation traveling the same distance.

Another problem known in the art with the ILFM system is that it does not provide bandwidth sufficient for many communications applications.

It is desirable to structurally modify an ILFM system known in the art so that it is enabled to perform OOK, BPSK and QPSK modulation over a wider bandwidth.

SUMMARY OF THE INVENTION

The claimed subject matter is an edge combining transmitter system. The system includes a reference clock which outputs a reference signal and an injection-locked oscillator, operatively coupled to the reference clock, which outputs a low frequency signal output. The system further includes an edge combining power amplifier (ECPA), made up of a phase branch and a phase' branch and operatively coupled to the injection-locked oscillator. The phase and phase' branches are made up of multiple phase and phase' sub-branches, respectively. The ECPA outputs a high frequency output to a transmitter operatively coupled to the ECPA.

DETAILED DESCRIPTION OF INVENTION

Figure 1:
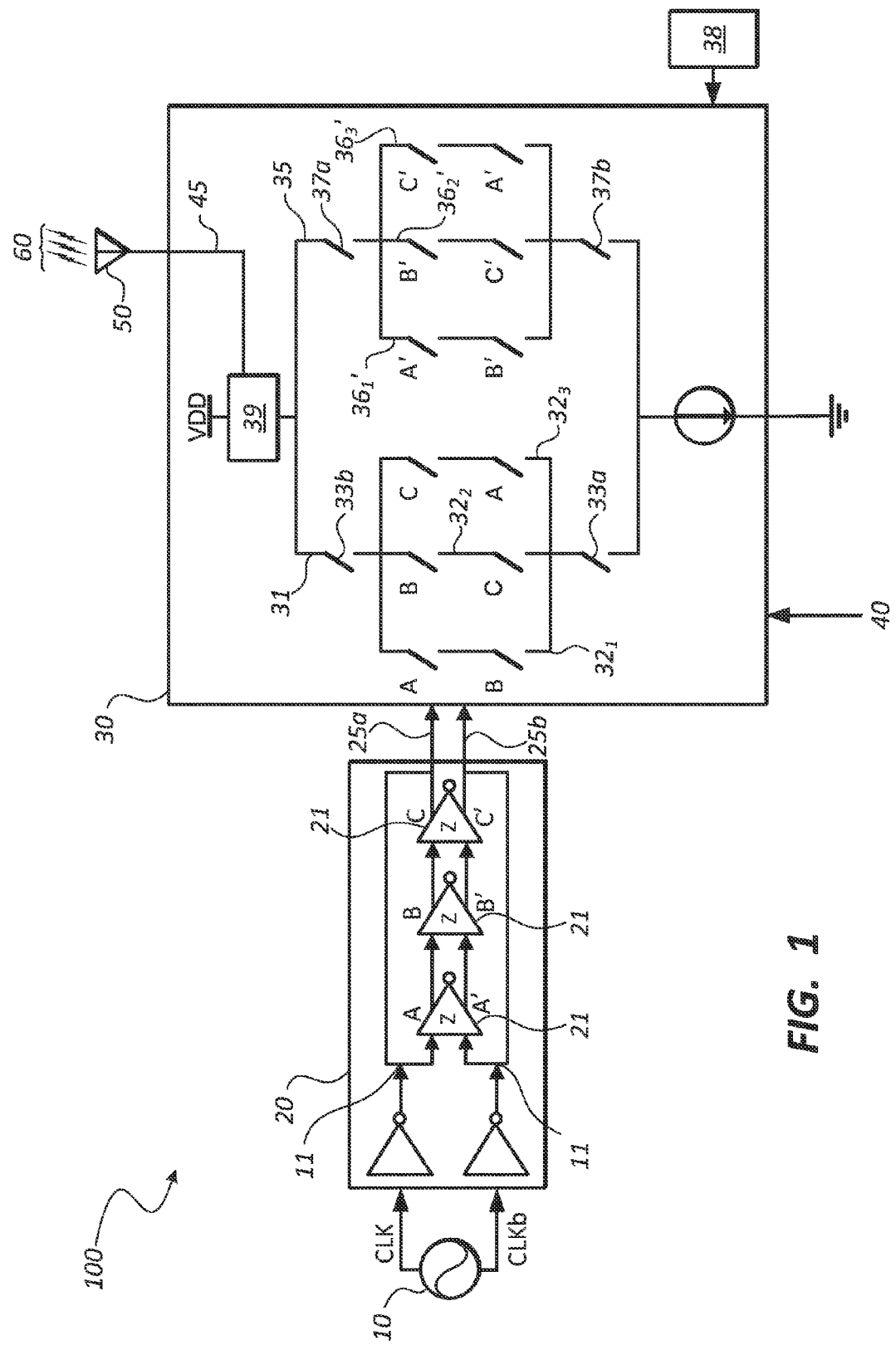
FIG. 1 illustrates an exemplary embodiment of an edge combining binary phase shift keying (BPSK) transmitter system utilizing an edge combining power amplifier (ECPA).

FIG. 1 illustrates an exemplary embodiment of an edge combining binary phase shift keying (BPSK) transmitter system 100. The system components visible in FIG. 1 include a reference clock 10, injection locking point 11, a differential oscillator 20, stages 21, low frequency outputs 25a and 25b, an edge combining power amplifier (ECPA) 30, a first phase branch 31, first phase switches $32_1$, $32_2$, and $32_3$, a second phase branch 35, second phase switches $36_1$, $36_2$, and $36_3$, a processor 38, a load 39, a phase selector input 40, a high frequency signal 45, a transmitter 50, and an output signal 60.

As illustrated in FIG. 1, a reference clock 10 outputs a low frequency reference signal having a drive strength X and is injection locked to the differential oscillator 20 at injection locking point 11. An ECPA 30 uses first phase branch 31, first phase switches 33a and 33b, second phase branch 35, second phase switches 37a, and 37b, processor 38, and load 39 to convert the low frequency outputs 25a and 25b of the differential oscillator 20 into a single high frequency signal 45. In this exemplary embodiment, the system 100 applies added phase controls 40 to control phase of the high frequency signal 45. High frequency signal 45 then passes to transmitter 50 for conversion to a signal output 60 and transmission.

In the exemplary embodiment of FIG. 1, reference clock 10 is an electronic oscillator circuit such as, but not limited to a crystal oscillator. Reference clock 10 connects to differential oscillator 20 by a path, an electrical connection which may be, but is not limited to a wire, a circuit, a nanowire or conductive material.

In various embodiments, the differential oscillator 20 of FIG. 1 can be implemented in multiple forms such as, but not limited to a ring oscillator or an oscillator 20 with an increased or decreased number of stages 21. However, all forms must produce opposite phase outputs. Therefore, low frequency outputs 25a and 25b of differential oscillator 20 must have opposite phases. The phase difference from a low frequency output 25a to low frequency output 25b equals 360 degrees/F, wherein F is the number of low frequency outputs. In the exemplary embodiment, F is two, resulting in a phase difference of 180 degrees for low frequency output 25b. A number of subsignals equal the numbers of stages 21 in differential oscillator 20 make up low frequency outputs 25a and 25b.

While the exemplary embodiment illustrated in FIG. 1 uses three stages 21, adding more stages 21 results in a higher frequency signal 45 at the ECPA 30. In such an alternate embodiment, the higher frequency signal 45 equals the clock reference frequency multiplied by the number of oscillating stages 21. In another alternate embodiment, the differential oscillator 20 is a quadrature oscillator, enabling Quadrature Phase Shift Keying (QPSK) modulation. While a differential oscillator 20 may consume more power than a single ended oscillator, this is not necessary depending on what kind of oscillator is used. For example, differential oscillator 20 using a differential current mode logic (CML) would prevent increased power requirements. Differential oscillator 20 connects to ECPA 30 by a path, an electrical connection which may be, but is not limited to a wire, a circuit, a nanowire or conductive material.

The ECPA 30 of the exemplary transmitter system 100 of FIG. 1 has a number of phase branches equal to the number of low frequency outputs from differential oscillator 20. Since the exemplary embodiment has two low frequency outputs 25a and 25b, ECPA 30 has a first phase branch 31 and a second phase branch 35. An alternate contemplated embodiment using a quadrature oscillator would require four phase branches.

As seen in the exemplary embodiment of FIG. 1, first phase branch 31 further divides into n number of first phase sub-branches 32n and each second phase branch 35 further divides into n number of second phase sub-branches 36n. The number n of sub-branches 32n and 36n must match the number of oscillating stages 21 in differential oscillator 20. The first and second phase branches 31 and 35 and sub-branches 32n and 36n are electrical connections which may be, but are not limited to a wire, a circuit, a nanowire or conductive material Because the exemplary system 100 of FIG. 1 implements a differential oscillator 20, it requires a second phase branch 35 in the ECPA 30 to take inputs from the opposite phase low frequency output 25b coming from the differential oscillator 20. System 100 also adds first phase switches 33a and 33b and second phase switches 37a and 37b to control output phase. With this configuration, the output logic representation is as follows:

Output=Phase($AB+BC+CA$)+Phase'($A'B'+B'C'+C'A'$),
where $A$ and $A'$ are opposite phase, B and B' are opposite phase and C and C' are opposite phase.

First phase switches 33a and 33b and second phase switches 37a and 37b can be implemented with any technologies known in the art. Also, first phase switches 33a and 33b and second phase switches 37a and 37b can be implemented above first and second sub-branches 32n and 36n, below first and second sub-branches 32n and 36n or in both first and second sub-branches 32n and 36n.

In various embodiments of the system 100 of FIG. 1, the processor 38 of ECPA 30 may be, but is not limited to a microprocessor or a central processing unit. Any processor 38 must be capable of performing an edge-combining algorithm to produce high frequency signal 45.

In various embodiments, the ECPA 30 can be used with a resistive or non-resistive load 39. If resistive load or active load is used, then the high frequency signal 45 will be in square waveform. If inductive load or MEMS resonator device that has bandpass characteristic is used, then the high frequency signal 45 will be in sine waveform.

While the exemplary embodiment illustrated in FIG. 1 is a system, alternate contemplated embodiments may be, but are not limited to, a circuit board or chip apparatus.

Figure 2:
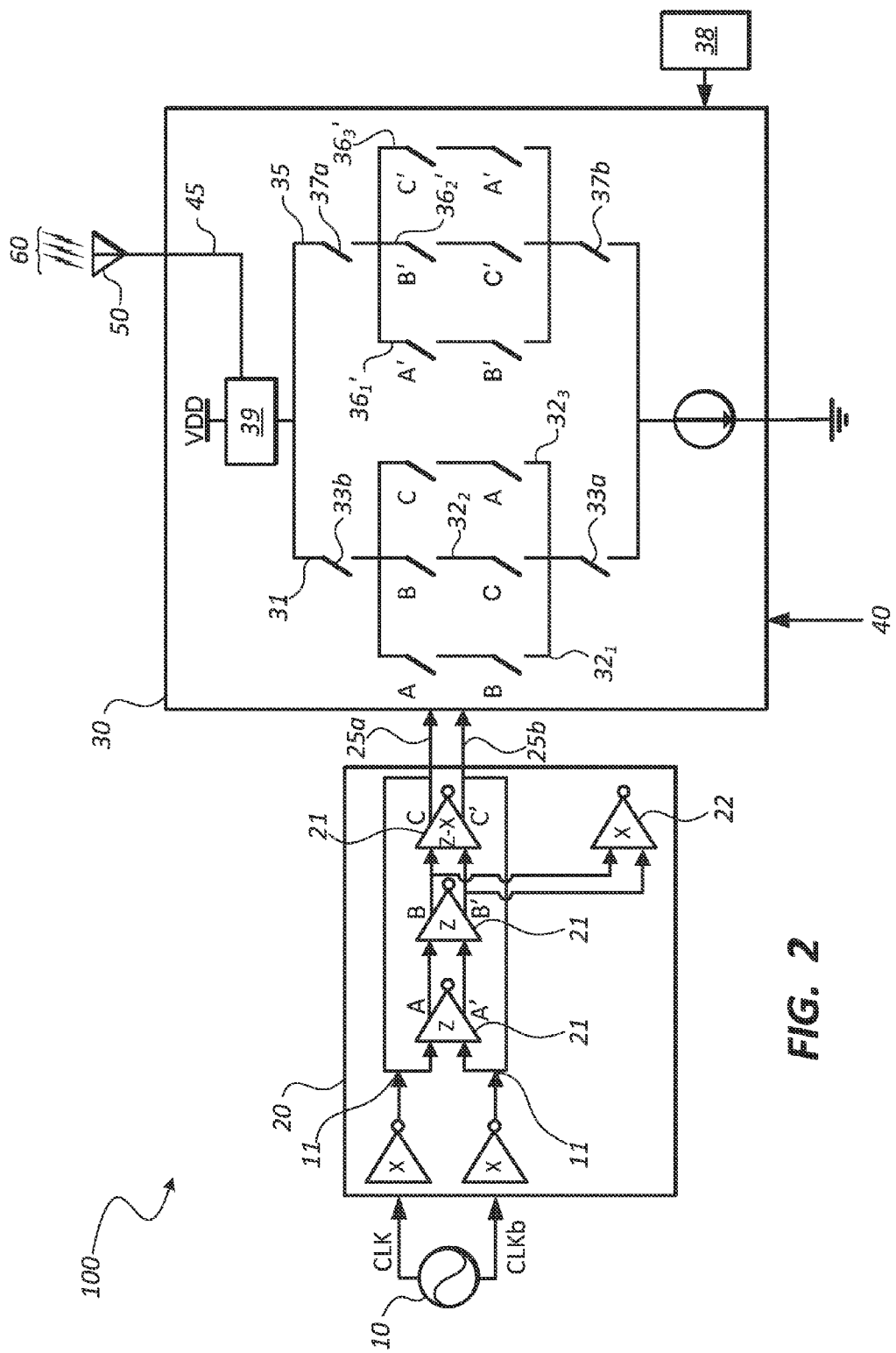
FIG. 2 illustrates an alternate embodiment of an edge combining transmitter system which includes a load balancing differential oscillator.

FIG. 2 illustrates an alternate embodiment of an edge combining transmitter system which includes a load balancing differential balancing oscillator.

As illustrated in FIG. 2, a differential oscillator 20 may be configured as a load balancing oscillator through the use of a buffer stage 22. In this exemplary oscillator 20, each stage 21 except the final stage has a drive strength Z. The buffer stage 22 captures and removes a drive strength of a magnitude X from the last stage 21, resulting in a drive strength equal to the difference between Z and X being fed back to injection locking point 11. The value of X is equal to the value of the low frequency reference signal drive strength of reference clock 10. As a result, the signal strength found at the injection locking point 11 is even, resulting in an even output phase. This load balancing oscillator scheme can be also applied to a single ended oscillator.

Figure 3:
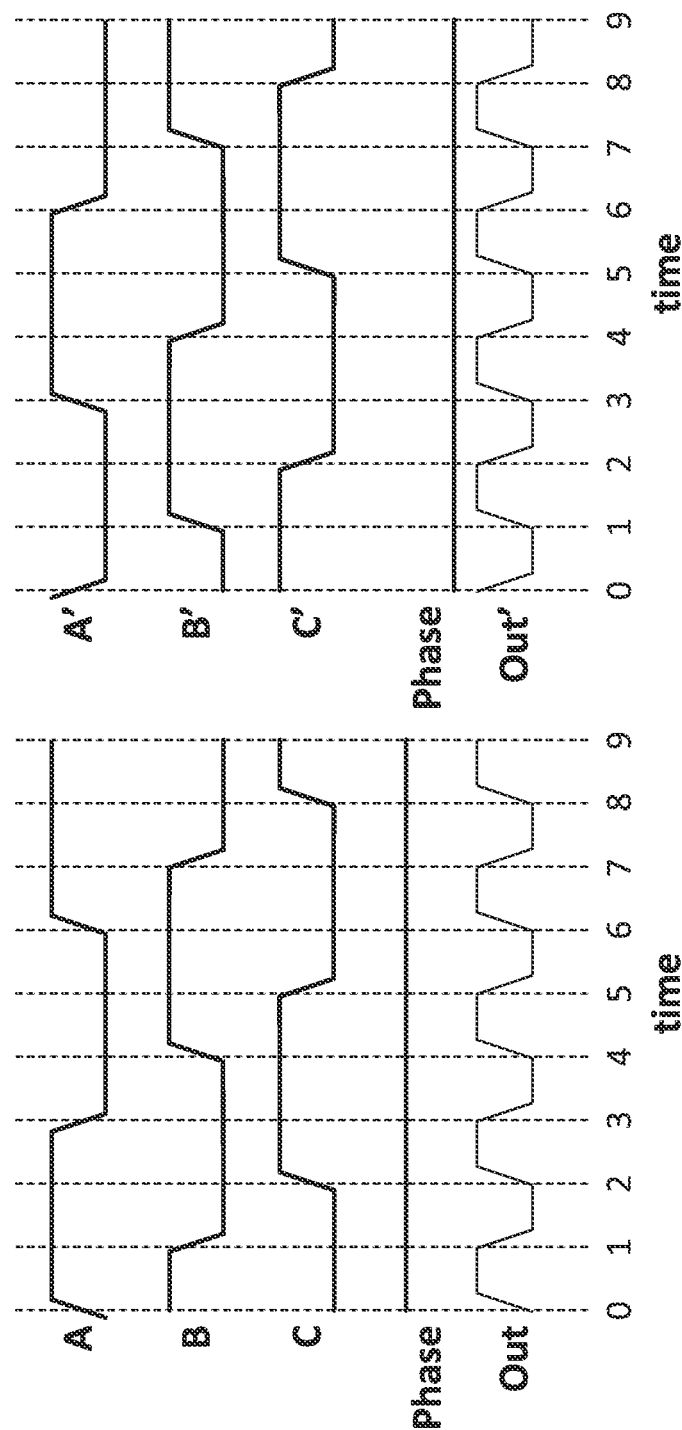
FIG. 3 illustrates a graph of frequency multiplication by the ECPA.

FIG. 3 illustrates a graph of the frequency multiplication by the ECPA. FIG. 3 illustrates the detailed timing diagram of how high frequency output can be obtained. Note that by controlling first phase switches 33a and 33b and second phase switches 37a and 37b, the system can be operated with BPSK modulation. If first phase switches 33a and 33b are shorted and second phase switches 37a and 37b are open then FSK modulation can be obtained by tuning reference clock 10. If second phase switches 37a and 37b are open, On-Off Keying (OOK) modulation can be operated by controlling first phase switches 33a and 33b, which will turn the transmitter output on and off. By the same token, if first phase switches 33a and 33b are open, then second phase switches 37a or 37b can be controlled to operate OOK modulation.

With this configuration, the exemplary system 100 can operate OOK, FSK and BPSK modulation. In an ILFM system, the modulation scheme was limited to FSK by changing the reference frequency which resulted in the output frequency shifting. By implementing a differential oscillator and added branches and switches in the edge combining power amplifier, the proposed transmitter can perform OOK and BPSK operation in addition to FSK. The advantages of BPSK are better noise immunity and bandwidth efficiency than FSK. Because the differential modulator and ECPA will not require additional power compared to an ILFM system, BPSK and OOK modulation can be added with nearly same power consumption as the ILFM system.

It will be understood that many additional changes in the details, materials, steps and arrangement of parts, which have been herein described and illustrated to explain the nature of the invention, may be made by those skilled in the art within the principal and scope of the invention as expressed in the appended claims.

I claim:

1. A binary phase shift keying (BPSK) transmitter system, comprised of:
    an oscillator configured to generate a plurality of first phase signals and a plurality of second phase signals based on a reference clock at a first frequency, each of the plurality of first phase signals and a corresponding one of the plurality of second phase signals having substantially opposite phases; and a transmitter circuit configured to transmit an output signal through an output port at a second frequency higher than the first frequency, the transmitter circuit comprising:
  a first edge combining circuit coupled to the output port, the first edge combining circuit to generate the output signal in a first output phase by combining the plurality of first phase signals,
  a first phase control switch coupled in series with the first edge combining circuit and the output port,
  a second edge combining circuit coupled to the output port, the second edge combining circuit to generate the output signal in a second output phase by combining the plurality of second phase signals, and
  a second phase control switch coupled in series with the second edge combining circuit and the output port, wherein the first phase control switch and the second phase control switch are to control the phase of the output signal.

2. The system of claim 1, wherein said oscillator is a differential ring oscillator.

3. The system of claim 1, wherein said oscillator is a quadrature oscillator.

4. The system of claim 1, wherein said oscillator includes an injection locking point at which a reference signal generated based on the reference clock and a signal from a last stage of said oscillator are input into a first stage of said oscillator.

5. The system of claim 4, wherein each stage of said oscillator except said last stage generates a drive strength signal of equal magnitude.

6. The system of claim 5, wherein a preceding stage of said last stage drives said last stage and a buffer stage and wherein drive strength of the preceding stage is equal to a sum of drive strength of said last stage and drive strength of the buffer stage.

7. The transmitter system of claim 6, further comprising an injection input stage between the reference clock and the injection locking point, wherein drive strength of the injection input stage is equal to the drive strength of the buffer stage.

8. The transmitter system of claim 1, wherein the first edge combining circuit comprises:
  a first switch coupled in series with the output port and the first phase control switch, the first switch controlled by a first signal of the plurality of first phase signals; and
  a second switch coupled in series with the output port, the first phase control switch and the first switch, the second switch controlled by a second signal of the plurality of first phase signals.

9. The transmitter system of claim 8, wherein the first edge combining circuit further comprises:
  a third switch coupled in series with the output port and the first phase control switch, the third switch controlled by the second signal of the plurality of first phase signals; and
  a fourth switch coupled in series with the output port, the first phase control switch and the third switch, the fourth switch controlled by a third signal of the plurality of first phase signals.

10. The transmitter system of claim 8, wherein the second edge combining circuit comprises:
  a third switch coupled in series with the output port and the second phase control switch, the third switch controlled by a third signal of the plurality of second phase signals, the third signal and the first signal having substantially opposite phases with each other; and
  a fourth switch coupled in series with the output port, the second phase control switch and the third switch, the fourth switch controlled by a fourth signal of the plurality of second phase signals, the fourth signal and the second signal having substantially opposite phases with each other.

11. A transmitter chip apparatus, comprised of:
  a reference clock, wherein said reference clock outputs a reference signal at a first frequency;
  a differential oscillator operatively coupled to said reference clock, the differential oscillator configured to generate a plurality of first phase signals and a plurality of second phase signals based on the reference clock signal at the first frequency, each of the plurality of first phase signals and a corresponding one of the plurality of second phase signals having substantially opposite phases; and
  a binary phase shift keying transmitter circuit configured to transmit an output signal through an output port at a second frequency higher than the first frequency, the transmitter circuit comprising:
    a first edge combining circuit coupled to the output port, the first edge combining circuit to generate the output signal in a first output phase by combining the plurality of first phase signals,
    a first phase control switch coupled in series with the first edge combining circuit and the output port,
    a second edge combining circuit coupled to the output port, the second edge combining circuit to generate the output signal in a second output phase by combining the plurality of second phase signals, and
    a second phase control switch coupled in series with the second edge combining circuit and the output port, wherein the first phase control switch and the second phase control switch are to control the phase of the output signal.

12. The apparatus of claim 11, wherein said differential oscillator is operatively coupled to said reference clock by a first path and wherein an edge combining power amplifier (ECPA) is operatively coupled to said differential oscillator by at least one second path; wherein said ECPA includes a processor, a first phase branch and a second phase branch, wherein each of said first and second phase branches has a plurality of subbranches matching said number of stages in said differential oscillator and said number of sub signals.

13. The apparatus of claim 12, wherein said first path, said at least one second path, said first and second phase branches and said sub-branches are electrical connections selected from a group consisting of a circuit, a nanowire or conductive material.

14. The apparatus of claim 11, wherein a signal amplitude of one of said subsignals is equal to a signal amplitude of another of said sub signals.

15. The apparatus of claim 11, wherein said differential oscillator is a ring oscillator and F is equal to two, wherein F is the number of low frequency outputs.

16. The apparatus of claim 11, wherein said differential oscillator is a quadrature oscillator and F is equal to four, wherein F is the number of low frequency outputs.

17. The apparatus of claim 11, wherein said differential oscillator is an injection-locked oscillator having an injection locking point at which said low frequency reference signal and a signal from a last stage of said differential oscillator are input into said differential oscillator.

18. The apparatus of claim 17, wherein each of said stages of said differential oscillator except said last stage has a drive strength Z.

19. The apparatus of claim 18, wherein a preceding stage is coupled to said last stage and a buffer stage, wherein said buffer stage has a buffer drive strength X, wherein X equals said low frequency reference signal drive strength, and wherein said last stage has a last drive strength equal to the difference between Z and X.

* * * * *